US006934508B2

(12) United States Patent
Ceresoli et al.

(10) Patent No.: US 6,934,508 B2
(45) Date of Patent: Aug. 23, 2005

(54) SYSTEM AND METHOD FOR OBTAINING COMPREHENSIVE VEHICLE RADIO LISTENER STATISTICS

(75) Inventors: Carl D. Ceresoli, Cumming, GA (US); Bruce E. Layman, Alpharetta, GA (US); Alexander Birger, Cumming, GA (US); Mikhail Kvetny, Lawrenceville, GA (US); Boris Smychkovich, Alpharetta, GA (US)

(73) Assignee: Navigaug Inc., Alpharetta, GA (US)

( * ) Notice: Subject to any disclaimer, the term of this patent is extended or adjusted under 35 U.S.C. 154(b) by 602 days.

(21) Appl. No.: 09/996,770

(22) Filed: Nov. 30, 2001

(65) Prior Publication Data

US 2004/0127192 A1 Jul. 1, 2004

Related U.S. Application Data

(60) Provisional application No. 60/276,489, filed on Mar. 19, 2001, provisional application No. 60/299,402, filed on Jun. 19, 2001, and provisional application No. 60/299,787, filed on Jun. 22, 2001.

(51) Int. Cl.[7] .................................................. H04Q 7/20

(52) U.S. Cl. .................... 455/2.01; 455/3.01; 455/3.04; 455/428

(58) Field of Search .............................. 455/2.01, 3.02, 455/3.01, 3.06, 422.1, 428, 12.1, 405, 423; 725/131, 66, 63, 134, 110, 141; 370/326, 442; 342/357

(56) References Cited

U.S. PATENT DOCUMENTS

| | | | | |
|---|---|---|---|---|
| 4,354,275 A | * | 10/1982 | Bouyssounouse et al. | 455/521 |
| 4,425,578 A | | 1/1984 | Haselwood et al. | |
| 4,499,601 A | | 2/1985 | Matthews | |
| 4,603,232 A | | 7/1986 | Kurland et al. | |
| 4,618,995 A | | 10/1986 | Kemp | |
| 4,718,106 A | | 1/1988 | Weinblatt | |
| 4,905,080 A | | 2/1990 | Watanabe et al. | |
| 4,907,079 A | | 3/1990 | Turner et al. | |
| 4,955,070 A | | 9/1990 | Welsh et al. | |
| 5,023,929 A | | 6/1991 | Call | |
| 5,278,988 A | | 1/1994 | Dejean et al. | |
| 5,382,970 A | | 1/1995 | Kiefl | |
| 5,408,683 A | | 4/1995 | Ablay et al. | |
| 5,457,807 A | | 10/1995 | Weinblatt | |
| 5,483,276 A | | 1/1996 | Brooks et al. | |
| 5,488,408 A | | 1/1996 | Maduzia et al. | |
| 5,561,835 A | | 10/1996 | Worthy | |
| 5,579,124 A | | 11/1996 | Aijala et al. | |

(Continued)

FOREIGN PATENT DOCUMENTS

| | | |
|---|---|---|
| JP | 7327017 | 12/1995 |
| WO | WO 99/13593 A1 | 3/1999 |

*Primary Examiner*—Jean Gelin
(74) *Attorney, Agent, or Firm*—Gary R. Jarosik

(57) ABSTRACT

A system, apparatus, method and computer program product to obtain comprehensive vehicle radio listener statistics based on parameters such as radio status (e.g., on/off status and CD/Tape/AM/FM setting), radio volume, station preset information, current frequency setting (i.e., station identification), and Global Positioning Satellite (GPS) system coordinates is disclosed. A vehicle-mounted field unit for collecting and transmitting such parameters to a base station is also disclosed. The system monitors and stores all events related to the occupants' interaction with the vehicle's radio, including automatic detection of the selected radio station through a speaker port. The stored data is then transmitted to a base station's central collection computer for immediate compilation and analysis. The system is capable of producing detailed reports containing error-free, unbiased, audience measurement statistics which can be made available to subscribers such as broadcasters, corporate advertisers, advertising agencies and the like.

20 Claims, 11 Drawing Sheets

U.S. PATENT DOCUMENTS

| | | | | | |
|---|---|---|---|---|---|
| 5,654,719 | A | | 8/1997 | Kunii | |
| 5,749,043 | A | | 5/1998 | Worthy | |
| 5,778,182 | A | | 7/1998 | Cathey et al. | |
| 5,816,155 | A | | 10/1998 | Stephan | |
| 5,819,155 | A | | 10/1998 | Worthy et al. | |
| 5,819,156 | A | | 10/1998 | Belmont | |
| 5,826,164 | A | | 10/1998 | Weinblatt | |
| 5,835,593 | A | | 11/1998 | Tsutsui | |
| 5,839,050 | A | | 11/1998 | Baehr et al. | |
| 5,850,249 | A | | 12/1998 | Massetti et al. | |
| 5,872,588 | A | | 2/1999 | Aras et al. | |
| 5,896,554 | A | * | 4/1999 | Itoh | 455/2.01 |
| 5,913,204 | A | | 6/1999 | Kelly | |
| 5,946,026 | A | | 8/1999 | Suzuki | |
| 5,973,683 | A | | 10/1999 | Cragun et al. | |
| 5,974,299 | A | | 10/1999 | Massetti | |
| 6,005,697 | A | | 12/1999 | Wu et al. | |
| 6,013,007 | A | * | 1/2000 | Root et al. | 482/8 |
| 6,081,690 | A | | 6/2000 | Worthy | |
| 6,202,210 | B1 | | 3/2001 | Ludtke | |
| 6,289,346 | B1 | * | 9/2001 | Milewski et al. | 707/10 |
| 6,424,816 | B1 | * | 7/2002 | Stephens | 455/2.01 |
| 6,466,765 | B1 | * | 10/2002 | Tanaka et al. | 455/2.01 |
| 6,684,054 | B1 | * | 1/2004 | Worthy | 455/2.01 |
| 6,760,652 | B2 | * | 7/2004 | Ogasawara | 701/36 |
| 2002/0120501 | A1 | * | 8/2002 | Bell et al. | 705/14 |
| 2002/0132575 | A1 | * | 9/2002 | Kesling et al. | 455/2.01 |

* cited by examiner

| FM FREQUENCY 94.5 | SNAPSHOT BROADCAST REPORT- |
|---|---|

REPORT SCHEDULE -
7:00:00 AM - TO - 9:00:00 AM

TO FIG. 4B CONT.

LISTENING AUDIENCE DISTRIBUTION

▷ NORTH ATLANTA METRO
AUDIENCE - 401,040
MARKET RANKING - 2
LISTENING DURATION - 0:52:21
FALLOUT 1 - 95.3
FALLOUT 2 - 103.5
FALLOUT 3 - 96.7

▷ EAST ATLANTA METRO
AUDIENCE - 55,316
MARKET RANKING - 5
LISTENING DURATION - 0:23:55
FALLOUT 1 - 106.9
FALLOUT 2 - 95.3
FALLOUT 3 - 96.7

▷ SOUTH ATLANTA METRO
AUDIENCE - 26,121
MARKET RANKING - 9
LISTENING DURATION - 0:15:31
FALLOUT 1 - 95.3
FALLOUT 2 - 99.7
FALLOUT 3 - 92.9

▷ WEST ATLANTA METRO
AUDIENCE - 29,707
MARKET RANKING - 8
LISTENING DURATION - 0:09:25
FALLOUT 1 - 96.7
FALLOUT 2 - 95.3
FALLOUT 3 - 93.5

FIG. 4B

MARKET STATISTICS

| | NORTH | EAST | SOUTH | WEST |
|---|---|---|---|---|
| POPULATION - | 1,115,459 | 941,169 | 732,020 | 697,162 |
| DAILY LISTENING - | 3:25:41 | 2:56:54 | 4:28:29 | 3:10:28 |
| MORNING - | 35.4% | 30.1% | 29.4% | 31.7% |
| AFTERNOON - | 21.8% | 25.8% | 26.8% | 19.2% |
| EVENING - | 36.1% | 31.7% | 19.8% | 32.2% |
| NIGHT - | 6.7% | 12.4% | 24.0% | 16.9% |
| TOP STATION - | 95.3 | 95.3 | 101.7 | 96.7 |

FROM FIG. 4B

ATLANTA, GA

ESTIMATED TOTAL LISTENING POPULATION - 3,485,810
TOTAL SAMPLE SIZE - 1,000
ESTIMATED STATION LISTENING AUDIENCE - 512,184

INFORMATION BASED ON GPS TRACKING OF SAMPLE LISTENING POPULATION

SYSTEM AND METHOD FOR OBTAINING COMPREHENSIVE VEHICLE RADIO LISTENER STATISTICS

This application claims priority from U.S. Provisional Application Ser. No. 60/276,489, filed Mar. 19, 2001, U.S. Provisional Application Ser. No. 60/299,402, filed Jun. 19, 2001, and U.S. Provisional Application Ser. No. 60/299,787, filed Jun. 22, 2001. The entirety of each of these provisional applications is incorporated herein by reference.

BACKGROUND OF THE INVENTION

1. Field of the Invention

The present invention relates generally to computer information gathering and processing systems, and more particularly to a computer-based system and apparatus for monitoring, recording, and reporting vehicle radio listener statistics.

2. Related Art

In today's competitive business environment, it is common for advertisers, marketers, business concerns and the like to desire to gauge the likes and dislikes of the general public. It is important to successful business endeavors to have some measure of the public's reaction to a business concern's products and services. This fundamental principle of business is no less true in the radio broadcasting industry. That is, in the radio world, monitoring broadcasts and determining the demographics of listeners is essential to running a successful broadcasting business. Radio advertising executives exert a significant amount of energy searching for more detailed information to guide their marketing investment, which in 1999 exceeded $17.6 billion dollars. Also, station owners are in the same search for information to guide their programming and on-air talent scheduling.

Arbitron, Inc. of New York, N.Y. currently offers a radio listener statistical gathering and reporting service (i.e., a rating service). Arbitron rates broadcasts based on the listening audience tuned into a particular station on a quarterly basis. This rating, unlike rating services for television broadcast done by Nielsen Media Research, Inc. of New York, N.Y., is not done in real time. Over the past fifty years, the conventional (Arbitron) method of providing these statistics is from a network of paper diaries maintained by thousands of listeners in markets across the United States.

More specifically, the Arbitron process collects paper questionnaires via random sampling of a market. Thus, for a given market, a certain percentage of the population is randomly selected and called. The calls are generated by random number dialing. Those persons who are contacted via the telephone are then asked if they are willing to participate in the Arbitron diary process. If the person agrees, Arbitron then sends that person a paper diary. The diary consists of three types of questions: (1) What did you listen to? (2) When did you listen to it? (3) Where were you when you listened to it? The participants are asked to collect this information and write it down in the provided diary over a seven-day period. At the end of that seven-day period, the diary is sent back to Arbitron. This process is repeated until a statistically relevant number of diaries are collected in the given market.

Many in the radio industry view this system as outdated and inadequate. This is because the statistical output lacks depth and the months-long lag time for receiving reports. The process is also vulnerable to bias and fraud. That is, if a participant prefers a specific station, they (intentionally or unintentionally) may fill the diary in a way that favors that particularly radio station. Further, if a person with fraudulent intentions obtains one or more diaries and skews them towards a particular station, this compromises the statistical integrity of the process. Despite these current limitations, in 1999, over $169 million dollars was spent by various broadcasters and other subscribers for listener statistics because alternative rating sources are not available.

In an attempt to overcome the above-described shortcomings, Arbitron has recently developed and is currently testing a "Portable People Meter" (PPM) system. The PPM is a pager-sized device that is worn or carried by survey participants throughout the day to collect radio listening statistics. The PPM, however, still faces several shortcomings such as lack of in-depth information recorded, contaminated data due to stray broadcast signals, expense of installing PPM signal embedding devices in multiple broadcast points, and skewed data due to visual presence of the PPM device on survey participants. Another shortcoming is that the PPM system's statistical integrity depends on survey participants actually wearing, activating, and periodically returning the PPM device to a base cradle to upload its stored information and re-charge its batteries.

Further, apparatus to monitor the selected radio station within a vehicle are known. These apparatus typically employ one of two know methods for detecting the tuned radio station. One method, known as a "sniffer" method, involves tuning the receiver to the local radio phase lock loop (PLL) and then calculating the tuned frequency by knowing the intermediate frequency (IF). The second method, known as a "comparator" method, involves comparing output audio signals from the speaker port to a (known) reference audio signal (i.e., a pre-selected radio station). Then, if the two signals are in phase, the tuned radio station can be identified. Both methods, however, suffer from shortcomings.

The sniffer method's shortcomings include the fact that different radio manufacturers have different IF frequencies (i.e., there are no standards for IF frequencies), and that some radio manufacturers do not have local PLL for AM radio stations, which makes them impossible to measure. The comparator method's shortcomings include the fact that it takes too much time (i.e., typically ten seconds or more) to find the selected station—which is disadvantageous if the vehicle's occupants have subsequently changed stations again.

A system that comprehensively monitors broadcasts and determines the demographics of listeners on a real time, or near real time, basis has not previously existed. Nor has an apparatus that automatically detects the selected radio station through a speaker port as part of that comprehensive system. Therefore, given the above, what is needed is a real-time system for obtaining, monitoring, recording and reporting comprehensive radio listener statistics which includes an apparatus that automatically detects the selected radio station.

SUMMARY OF THE INVENTION

The present invention meets the above-identified needs by providing a system, apparatus, method and computer program product for obtaining, monitoring, recording and reporting comprehensive radio listener statistics.

The present invention collects radio listener statistics from vehicle radios via a non-obtrusive, vehicle-mounted device. This device monitors and stores all events and parameters related to the vehicle's occupants interactions with the radio. Parameters monitored include, for example, radio status (e.g., on/off status and CD/Tape/AM/FM setting), radio volume (0%–100%), station preset information, current frequency setting (i.e., station identification), and Global Positioning Satellite (GPS) system coordinates. Each time a monitored parameter changes (e.g., station is changed, volume is lowered, etc.), the event is dated, time stamped and stored in the vehicle-mounted device for later transmission. The stored data is then transmitted periodically, via existing wireless networks, to a central collection computer (i.e., base station server) for immediate compilation and analysis. Results are then made available to users, including, for example, broadcasters, corporate advertisers, and advertising agencies.

The system also includes an apparatus within the vehicle-mounted device that automatically detects the selected radio station. In an embodiment, the apparatus uses a modulator to inject AM/FM code modulated carrier signals through a directional coupler connected to the vehicle radio. The directional coupler is inserted between the radio and the vehicle's antenna. A controller then recovers AM/FM code from the speaker through a band pass filter.

An advantage of the present invention is that it allows continuous parameter sampling of all vehicle-mounted field units within a specified market in order to provide more statistically accurate results.

Another advantage of the present invention is that it implements an unbiased and error-free data collection method that is not dependent on participant (i.e., the vehicle's occupants) memory recall, and it is not subject to fraud.

Another advantage of the present invention is that it provides precise data collection which allows specific broadcast events to be monitored. For example, listener reaction to specific broadcast segments can be measured by monitoring volume changes and fallout station information.

Yet another advantage of the present invention is that it provides listener reaction to specific on-air events that can be made available to advertisers and business concerns shortly after the broadcast or marketing campaign is aired. Further, custom surveys can be generated upon the request of users of the system.

Yet another advantage of the present invention is that it utilizes GPS information, which allows users of the system to get a more comprehensive understanding of the listening public.

Further features and advantages of the invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

Figure 1:
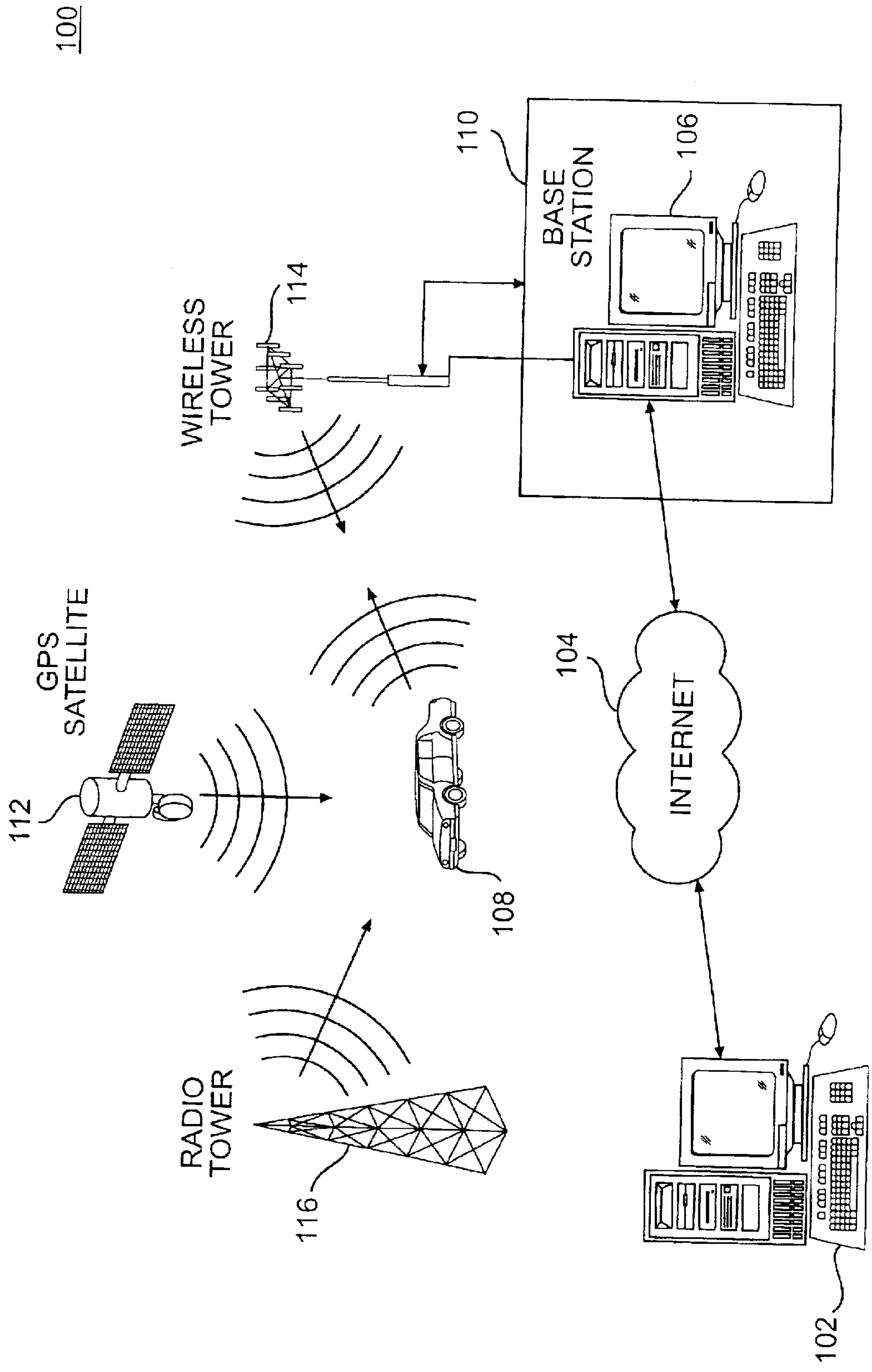
FIG. 1 is a block diagram illustrating the system architecture of an embodiment of the present invention, showing connectivity among the various components.

The present invention relates to a system, apparatus, method and computer program product for obtaining, monitoring, recording and reporting comprehensive radio listener statistics.

In an embodiment of the present invention, a service provider organization provides and allows access, perhaps on a subscriber fee or pay-per-use basis, to a tool that obtains, monitors, records and reports comprehensive vehicle radio listener statistics via the global Internet. That is, the service provider would provide the hardware (e.g., servers) and software (e.g., database) infrastructure, application software, customer support, and billing mechanism to allow its customers (e.g., broadcasters, corporate advertisers, advertising agencies and the like) to receive reports of, for example, listener reaction to specific on-air events or segments. The tool would be used by subscribers to obtain both real-time and historical information, characteristics, and trend analysis to make marketing and advertising decisions.

The level of detail collected by the present invention, which has not been seen in any conventional systems, allows broadcasters and advertisers the ability to accurately measure the effectiveness of new marketing campaigns, radio personalities, or other on-air broadcasts. Advertisers can know, within days, for example, how many listeners heard their advertisements, how many turned the station seconds into the airing, and how many turned the volume up to hear a particular broadcast segment. Stations will be able to see listener reactions to new on-air talents and broadcast segments identifying events that cause listeners to migrate to competitors. In each case, the reported statistics provide the ability to adjust and refine on-air content contributing to its overall effectiveness and value by reducing listener chum.

In an embodiment of the present invention, the service provider would provide a World Wide Web site where a subscriber, using a computer and Web browser software, can remotely view and receive comprehensive vehicle radio listener statistics.

In an alternate embodiment, the tool that obtains, monitors, records and reports comprehensive vehicle radio listener statistics may reside, instead of on the global Internet, locally on proprietary equipment owned by a subscriber (i.e., broadcasters, corporate advertisers, advertising agencies and the like) as a stand alone system software application.

The present invention is described in terms of the above examples. This is for convenience only and is not intended to limit the application of the present invention. In fact, after reading the following description, it will be apparent to one skilled in the relevant art(s) how to implement the following invention in alternative embodiments. For example, a service provider may utilize the existing wireless network's two-way communications capabilities in order to communicate with the vehicle and its occupants. This would allow the offering of ancillary services with the ability to launch mobile commerce, instant polling and (emergency) vehicle services utilizing the capabilities of the installed vehicle-mounted field units as described herein.

The terms "user," "subscriber," "customer," "company," "business concern," "broadcaster," "corporate advertiser," "advertising agency," and the plural form of these terms are used interchangeably throughout herein to refer to those who would access, use, and/or benefit from the tool that the present invention provides for obtaining, monitoring, recording and reporting comprehensive radio listener statistics.

II. System Architecture

Referring to FIG. 1, a block diagram illustrating the physical architecture of a vehicle radio listener statistics ("VRLS") system 100, according to an embodiment of the present invention, showing network connectivity among the various components, is shown. Such VRLS system 100 would cover a specific market area (e.g., metropolitan statistical area (MSA)) in which the service provider offers its services.

VRLS system 100 includes a plurality of users 102 (e.g., broadcasters, corporate advertisers, advertising agencies, and the like) which would access to system 100 using a personal computer (PC) (e.g., an IBM™ or compatible PC workstation running the Microsoft® Windows 95/98™ or Windows NT™ operating system, Macintosh® computer running the Mac® OS operating system, or the like), running a commercially available Web browser. (For simplicity, FIG. 1 shows only one user 102.) The users 102 would connect to the parts (i.e., infrastructure) of VRLS system 100 which are provided by the VRLS service provider via the global Internet 104.

In alternative embodiments, users 102 may access VRLS system 100 using any processing device including, but not limited to, a desktop computer, laptop, palmtop, workstation, set-top box, personal digital assistant (PDA), and the like.

VRLS system 100 also includes a base station 110 which contains a base station server 106. Server 106 is the "backbone" (i.e., VRLS processing) of the present invention. It provides the "front-end" for VRLS system 100. That is, server 106 contains a Web server process running at a Web site which sends out Web pages in response to Hypertext Transfer Protocol (HTTP) requests from remote browsers (i.e., subscribers 102 of the VRLS service provider). More specifically, it provides a graphical user interface (GUI) "front-end" screens to users 102 of VRLS system 100 in the form of Web pages. These Web pages, when sent to the subscriber's PC (or the like), would result in GUI screens being displayed.

In an embodiment of the present invention, server 106 is a Sun or NT workstation having access to a repository database implemented with the Oracle 8i RDBMS (relational database management server) software. The database is the central store for all information within VRLS system 100 (e.g., executable code, subscriber information such as login names, passwords, etc., and vehicle and demographics related data).

VRLS system 100 also includes a plurality of vehicles each with a vehicle-mounted field unit 108 which is explained in more detail below. (For simplicity, FIG. 1 shows only one vehicle having a field unit 108.) In an embodiment of the present invention, the vehicle-mounted field units 108 have access to the vehicle's radio in order to monitor, record, store and transmit the listener parameters as explained herein.

VRLS system 100 also includes a plurality of radio towers 116 from which each broadcaster in the market area transmits their signals on a unique frequency (i.e., their unique station identification). As will be apparent to one skilled in the relevant art(s), these signals are received by vehicle radios and thus, may be monitored by the vehicle-mounted field units 108 as described herein. Also received by the vehicle-mounted field units 108 are signals from the Global Positioning Satellite (GPS) constellation 112. As is well-known in the relevant art(s), the GPS constellation system 112 operationally consists of 24 satellites that provide global coverage. For any given reading, four satellites are required to compute the three dimensions of position (X, Y, and Z) and time. (For simplicity, however, FIG. 1 shows only one GPS satellite.) VRLS system 100 also includes a wireless communications infrastructure which, in one embodiment, consist of one or more wireless towers 114. (For simplicity, FIG. 1 shows only one tower 114.) As will be apparent to one skilled in the relevant art(s) after reading the description herein, the vehicle-mounted field units 108 are configured for the specific means of wireless mobile communications employed within the market area in which VRLS system 100 operates (e.g., satellite or terrestrial wireless). This allows the service provider to take advantage of existing wireless communication networks to transfer information collected by the field units 108 to base station 110.

As will be appreciated by one skilled in the relevant art(s) after reading the description herein, a service provider can replicate VRLS system 100 in each market area or MSA in which they offer services. Thus, several base stations 110 may be connected via a network proprietary to the service provider in order to produce vehicle radio statistics over several market areas.

Figure 2:
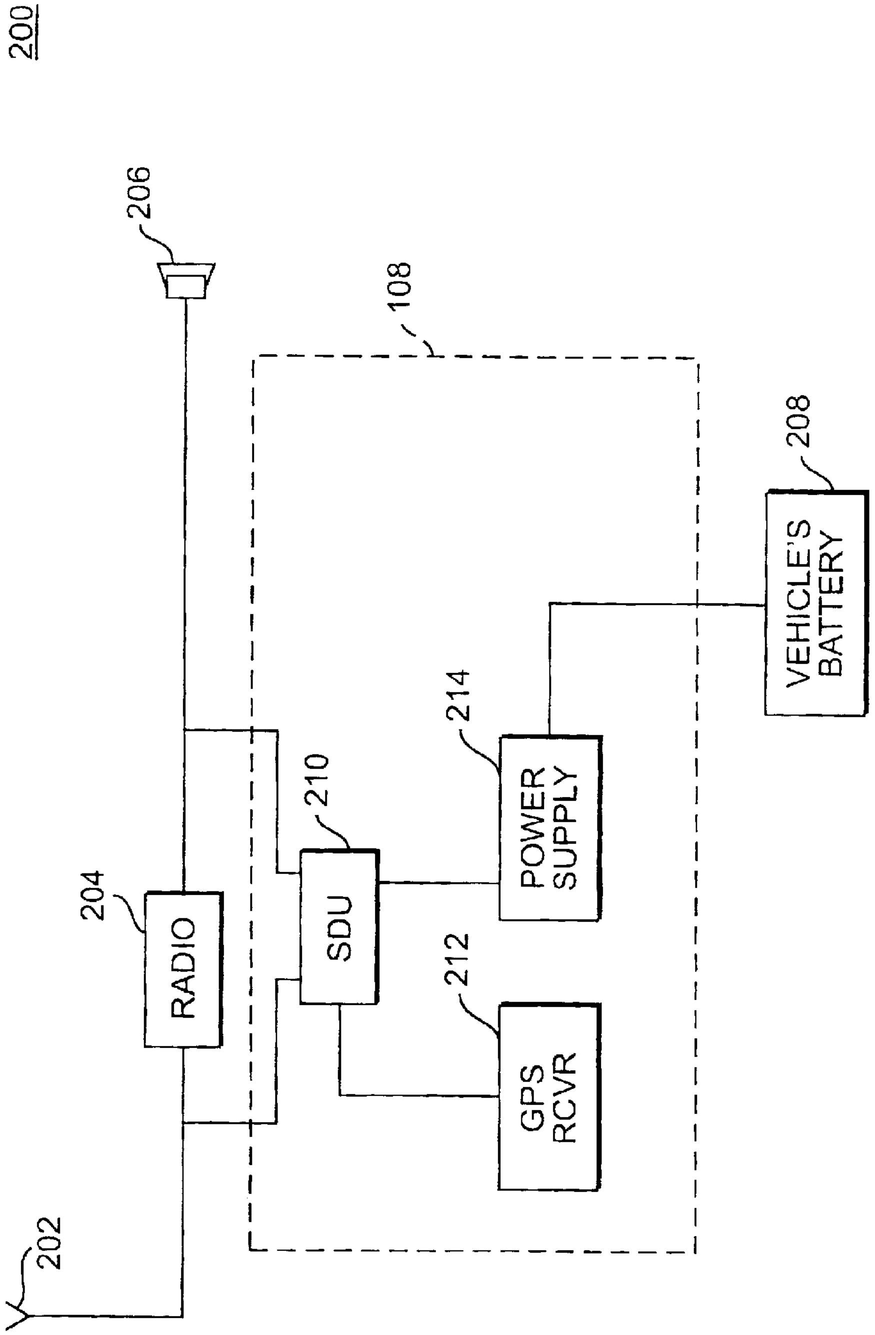
FIG. 2 is a block diagram of the physical architecture of a vehicle-mounted field unit according to an embodiment of the present invention.

Referring to FIG. 2, a block diagram 200 of the physical architecture of a vehicle-mounted field unit 108 and its connection to a vehicle according to an embodiment of the present invention is shown. The vehicle-mounted field unit 108 consists of a circuit board equipped with a radio station detection unit (SDU) 210, GPS receiver 212, and a power supply 214. In an embodiment, unit 108 is non-obtrusive, has dimensions approximately that of a deck of playing cards and is operable in the temperature range of −40° C. to +85° C. In an embodiment, unit 108 can reside either under the vehicle's dashboard or in the trunk and draw power from the vehicle's battery 208 through its power supply 214.

In an embodiment, SDU 210 is connected to the vehicle's radio 204 through connections between the antenna 202 and speaker 206 of vehicle radio 204 as shown in diagram 200. As will be apparent to one skilled in the relevant art(s), vehicle-mounted field unit 108 would also include an internal clock for date and time stamps and software code logic to drive the functionality described herein (i.e., interpretation of input data from the radio, speaker, and information sent from base station 110, and data preparation and compression of output data for transmission to base station 110). In one embodiment, such internal clock would be part of a processor residing on SDU 210 which is explained in more detail below.

As will be appreciated by one skilled in the relevant art(s) after reading the description herein, once a potential candidate is identified by the service provider, a vehicle-mounted field unit 108 will need to installed in their vehicle (whether it be a passenger, personal or commercial vehicle, van, truck, light truck, RV, etc.). Information such as each unit's electronic serial number and corresponding participant demographic information, as well as the total number of units installed would then be kept by the service provider to be utilized in the statistical reporting process as described herein.

Figure 5:
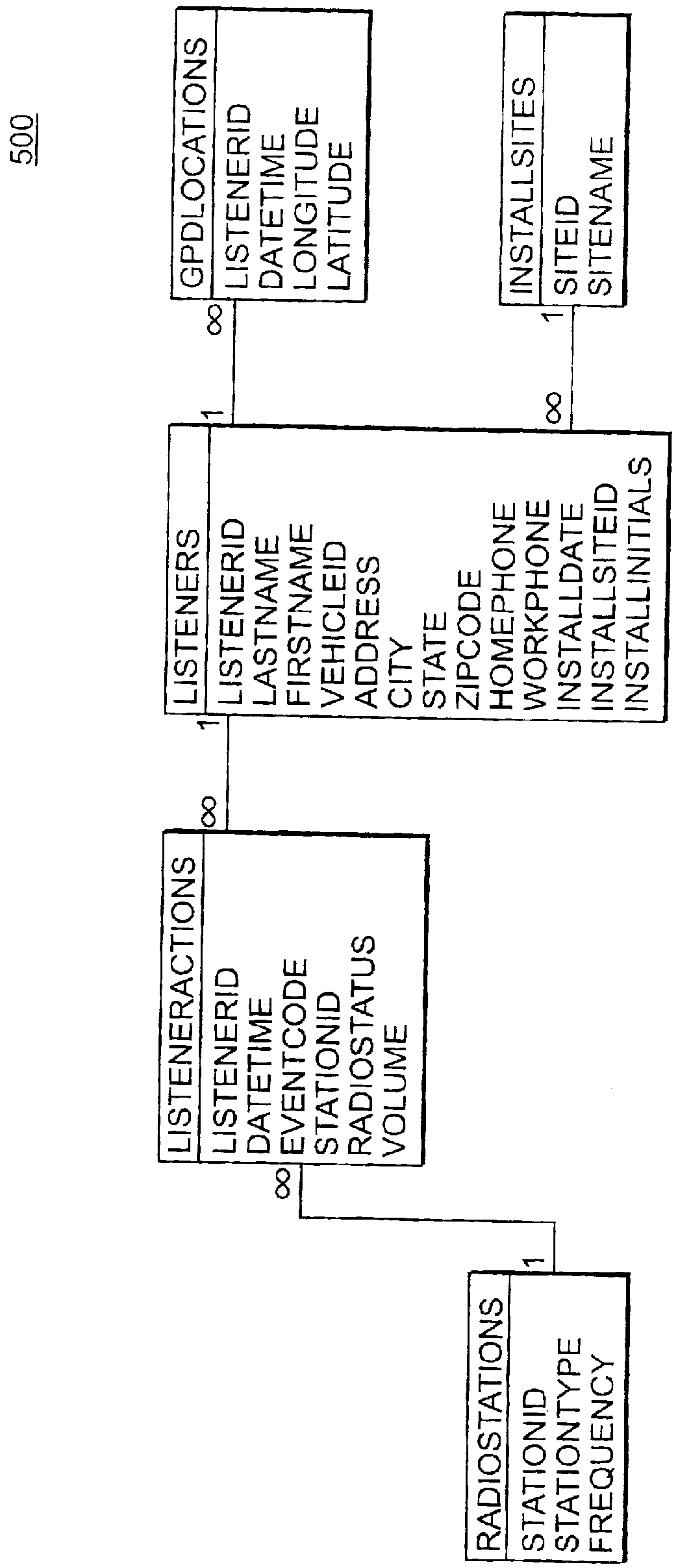
FIG. 5 is an Entity-Relationship diagram of example relational database tables according to an embodiment of present invention.

As mentioned above, in an embodiment of the present invention, server 106 has access to a repository database that is the central store for all information within VRLS system 100. Referring to FIG. 5, an Entity-Relationship diagram 500 of example relational database tables, according to an embodiment of present invention, is shown. The tables of diagram 500 contain symbols denoting the minimum and maximum cardinality of the relationship of the entities (i.e., tables) to one another, such as one-to-many ($1\rightarrow\infty$), or a many-to-one ($\infty\rightarrow 1$). As will be apparent to one skilled in the relevant art(s), the specific fields (and thus, tables) used within VRLS system 100 may vary depending on such characteristics as the type of statistics users 102 desire to be reported, etc.

More detailed descriptions of VRLS system 100 components, as well their functionality, are provided below.

III. System Communications and Operation

Figure 3:
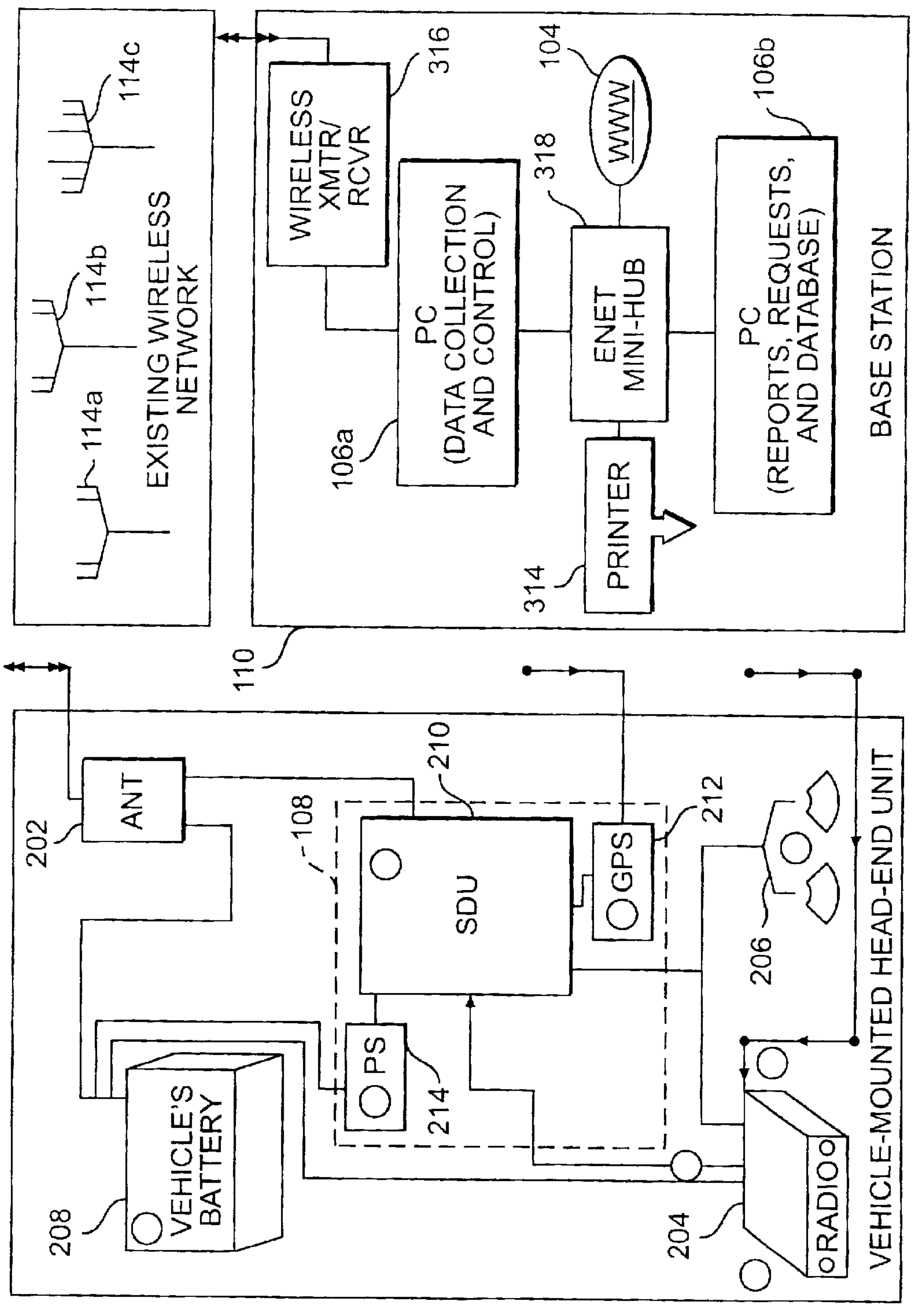
FIG. 3 is a detailed block diagram illustrating the system architecture of an embodiment of the present invention, showing communications among the various components.

FIG. 3 illustrates a detailed block diagram of the architecture of VRLS system 100, and shows the communications among the various components.

In an embodiment of VRLS system 100, vehicle-mounted field unit 108 has four points of connection to the vehicle. The first connection is to the vehicle's radio 204 via SDU 210 to monitor the activity parameters (i.e., frequency setting, on/off status, AM/FM/Cassette/CD setting, volume, etc.). In one embodiment of the present invention, SDU 210 can monitor the frequency setting of the radio 204 via the known sniffer or comparator methods or the novel method described below with reference to FIGS. 7 and 8.

The second connection from the vehicle-mounted field unit 108 is to the vehicle's speaker 206 via SDU 210. This allows volume adjustments to be monitored. In an alternate embodiment, this second connection will give the service provider the ability to present packet information in the form of verbal announcements to the vehicle's occupants (e.g., traffic and weather information).

The third connection from the vehicle-mounted field unit 108 is to the vehicle's antenna 202 in order to connect to the existing communications network (e.g., wireless towers 114). In an alternate embodiment, if the vehicle's antenna is unable to provide two-way functionality, an external wireless antenna will have to be mounted to the vehicle in order to connect to the existing communications network (e.g., wireless towers 114*a–c*).

The fourth and final connection from the vehicle-mounted field unit 108 is to the vehicle's power source (i.e., battery 208). As discussed above with reference to FIG. 2, the vehicle-mounted field unit 108 also contains receiver 212 to communicate with the GPS system 112 (not shown in FIG. 3).

The base station 110 serves as market specific data gatekeepers. That is, subscribers 102 are able to pull information from specific, multiple or all markets at any give time for immediate analysis. The distributed computing model has no single point of complete system failure, thus minimizing system 100 downtime. Base station 110 contains a transmitter/receiver 316 in order to connect to the existing communications network (e.g., wireless towers 114*a–c*).

In an embodiment of the present invention, SDU 210 includes a transceiver that takes advantage of existing wireless communication networks to transfer information collected by the field unit 108 and stored in its memory to base station server 106. Thus, such a transceiver would be compatible with wireless mobile communications standards such as satellite communications, code division multiple access (CDMA), time division multiple access (TDMA), the Bluetooth® wireless standard and the like as shown in FIG. 3.

As will be apparent to one skilled in the relevant art(s), all of components inside of base station 110 are connected and communicate via a wide or local area network (WAN or LAN) with a hub 318 running a secure communications protocol (e.g., secure sockets layer (SSL)) and having a connection to the Internet (and thus, WWW) 104.

In an embodiment, base station server 106 is distributed according to specific tasks. While two separate servers 106 (i.e., server 106*a* for data collection and server 106*b* for report generation) are shown in FIG. 3 for ease of explanation, it will be apparent to one skilled in the relevant art(s) that VRLS system 100 may utilize servers (and databases) physically located on one or more computers. Each server 106 contains software code logic that is responsible for handling tasks such as data interpretation, statistics processing, data preparation and compression for output to field units 108, and report generation for output to users 102 or printer 314, respectively.

In one embodiment of the present invention, the overall flow and operation of VRLS system 100 is as follows: After a predetermined time interval (e.g., a time interval measured in days, hours, minutes, etc.) of monitoring broadcasts and GPS coordinates, the vehicle-mounted field unit 108 prepares all stored data for transmission. The packet of information is sent via a wireless link 114 to base station 110 through base station transceiver 316. There, the data is processed (i.e., compiled and analyzed) by server 106*a*. Once this process is complete, a confirmation is sent back through the communications network to the field unit 108. The information is then made ready for distribution (i.e., reports are generated by server 106*b*) to subscribers 102. As will be appreciated by one skilled in the relevant art(s) after reading the description herein, the field unit 108 may be configured to transmit data collected from the vehicle with varying frequency (e.g., once every 5 minutes, twice a day, etc.). Such frequency would depend on factors such as the size of the memory on unit 108, bandwidth of the existing communications network, needs of the subscribers 102 and the like.

Figure 4A:
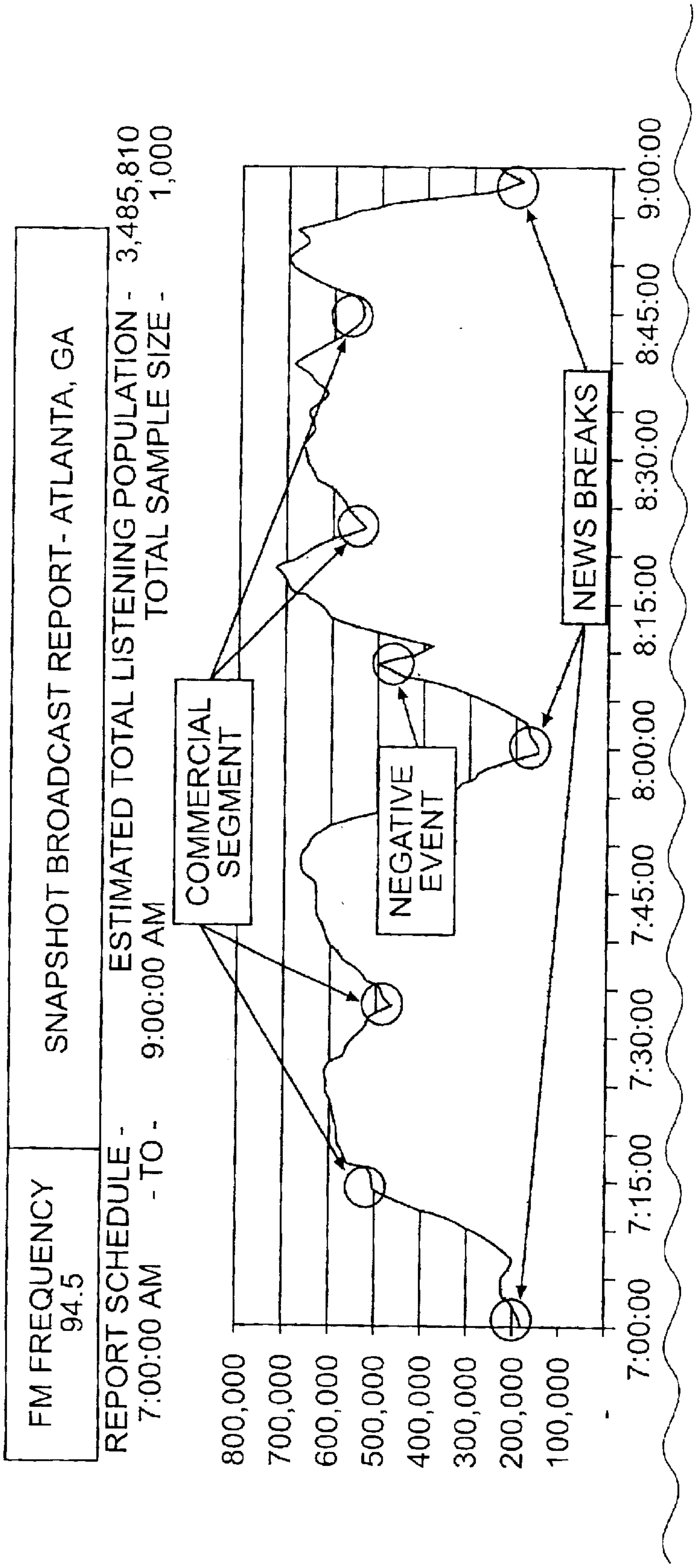
FIGS. 4A–B are windows or screen shots of exemplary reports generated by the graphical user interface of the present invention.
Figure 4A:
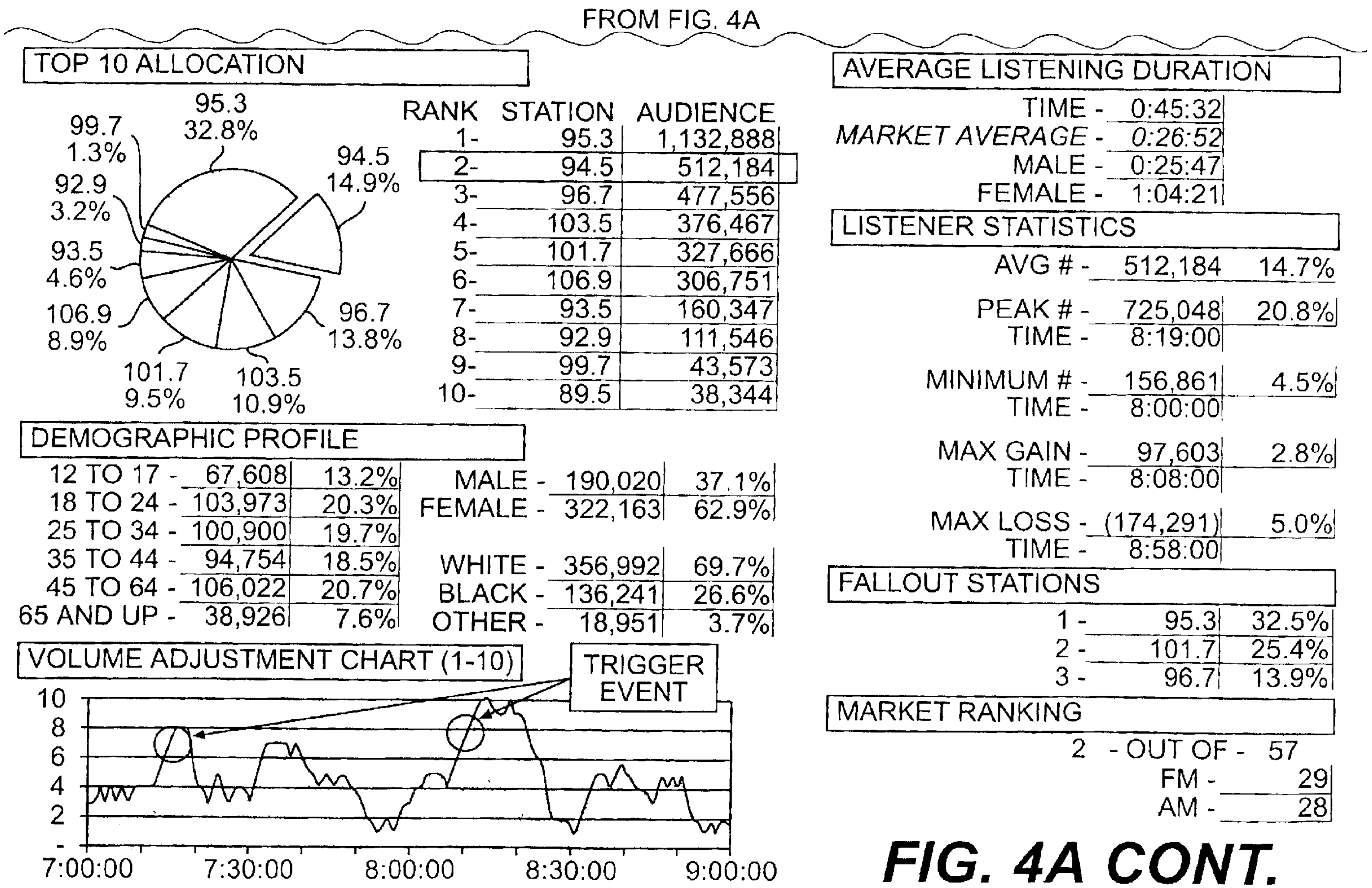
Figure 4B:
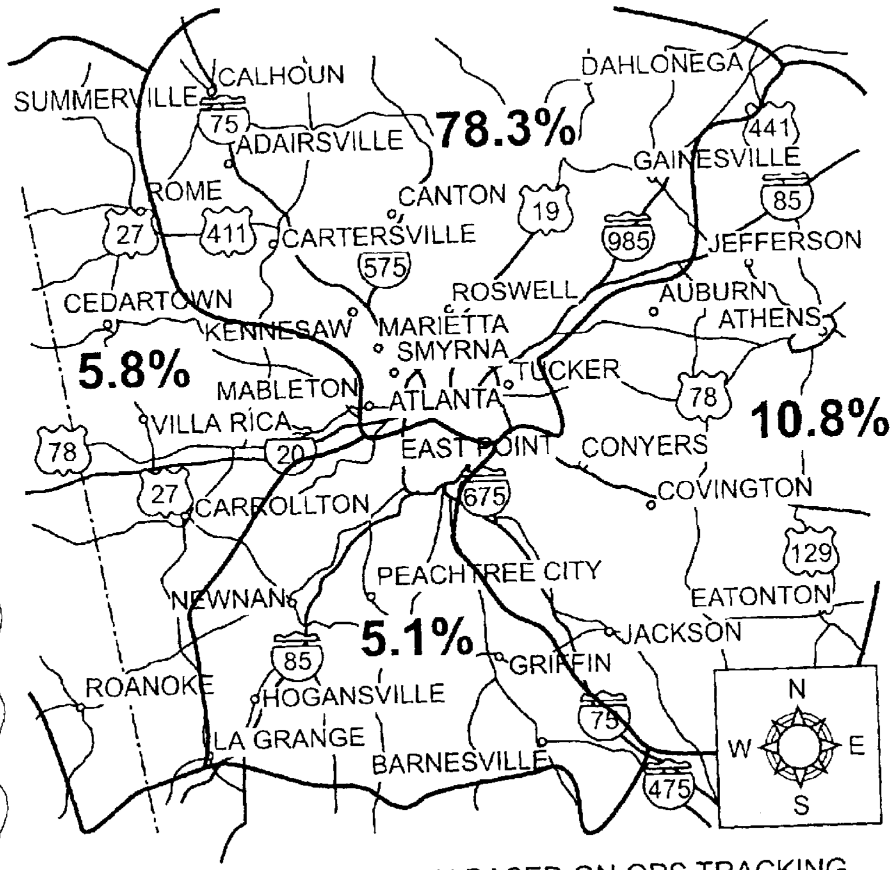
Figure 4B:
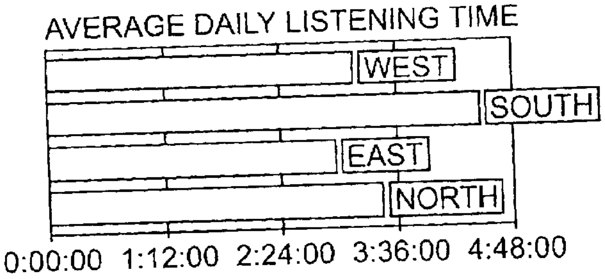

FIGS. 4A–B are windows or screen shots of exemplary reports generated by the graphical user interface of the present invention for a particular radio station (e.g., 94.5 FM) in a particular market (Atlanta, Ga.). It should be understood that the screens shown herein, which highlight the functionality of VRLS system 100, are presented for example purposes only. The software architecture (and thus, GUI screens) of the present invention are sufficiently flexible and configurable such that users 102 may receive reports (and navigate through in a manner) other than those shown in FIGS. 4A–B.

As mentioned above, a service provider may utilize the existing wireless network's two-way communications capabilities in order to communicate with the vehicle and its occupants, thus offering instant polling capabilities. More specifically, in an embodiment, the field unit 108 contains voice recognition components and a microphone that allows the vehicle occupants to keep both hands on the steering wheel while communicating with field unit 108. A verbal command key such as "Service Provider Poll" can be used to alert vehicle occupants (survey participants) that the unit 108 is now functioning as an instant polling mechanism.

During a poll, participants can then answer questions using simple canned responses such as:

A, B, C, D, or E;

1 through 5 (i.e., Worst to Best); and

Yes or No.

As will be appreciated by one skilled in the relevant art(s) after reading the description herein, vehicle owners who are chosen to have field units 108 installed for purposes of rating radio stations will represent a sensible scientific sample. Thus, such vehicle occupants are reflective of local communities, metro areas, regions or even an entire nation. The instant polling embodiment of the present invention is thus a natural extension of the functionality described above with respect to compiling and analyzing radio listener statistics. In the same manner, polls can be targeted to specific geographic areas, demographic profiles or any combination of these.

IV. Radio Station Detection Apparatus

As will be appreciated by those skilled in the relevant art(s), automatically detecting the selected radio station within the vehicle is an integral part of VRLS system 100. Such an apparatus and method, in one embodiment of the present invention, are now described.

Figure 7:
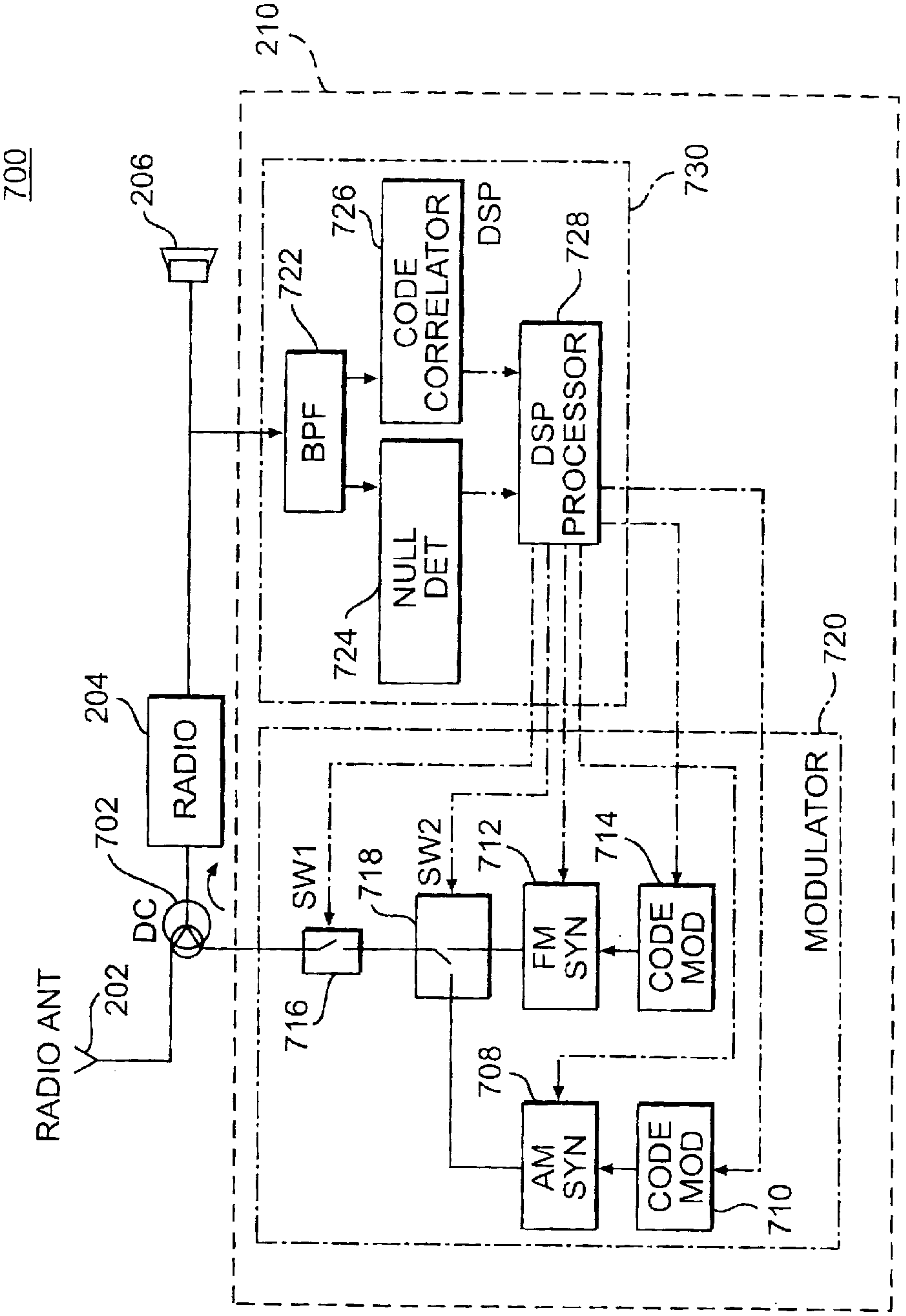
FIG. 7 is a block diagram of an apparatus that automatically detects the tuned radio station in one embodiment of the present invention.

Referring to FIG. 7, a detailed block diagram 700 of a station detection unit (SDU) 210 within vehicle-mounted field unit 108, according to an embodiment of the present invention, is shown. In such an embodiment, SDU 210 is an apparatus that automatically detects the selected radio station through a speaker port.

As shown in diagram 700, a directional coupler 702 is connected between the vehicle radio 204 and the radio antenna 202. In one embodiment, directional coupler 702 is a model ADC-10-1R coupler available from Mini-Circuit, Inc. of Brooklyn, N.Y. The radio 204 is connected to the radio speaker 206.

A modulator 720 is connected to the directional coupler 702. The modular includes an AM synthesizer 708, AM code modulator 710, FM synthesizer 712, and FM code modulator 714. Modulator 720 also includes a first switch 716 (labeled as "SW1" in diagram 700) and a second switch 718 (labeled as "SW2" in diagram 700). Switch 716 is used to define the timing for the injecting of radio signals into radio 204 by the modulator 720 through the coupled port of directional coupler 702. Switch 718 is used to select between the two modulator types (i.e., AM or FM).

A microprocessor 730 is connected to the modulator 720. Microprocessor 730 contains hardware and software code logic that controls the automatic selected radio station detection process by loading synthesizers 708 and 712, creating the modulation patterns and controlling switches 716 and 718. Microprocessor 730 also checks the correlation between the test signal injected into the radio 204 by SDU 210 and the signal recovered from speaker 206.

Microprocessor 730 also contains memory (not shown in diagram 700) where a pre-determined list of radio stations is stored. That is, in an embodiment, microprocessor 730 would be pre-programmed to store a list of all (e.g., 50–100) FM and AM stations within the metropolitan area or MSA in which the vehicle having on-board unit 108 were operated and the services of VRLS system 100 were offered.

In an alternate embodiment, microprocessor 730 would be programmed to store a list of all FM and AM stations within the relevant metropolitan area or MSA "on the fly." In such an embodiment, on-board unit 108 would contain an additional (auxiliary) tuner (e.g., a AD608 tuner available from Analog Devices, Inc. of Norwood, Mass.) coupled to antenna 202 via an additional directional coupler that would scan the entire FM and AM broadcast ranges once every pre-determined time interval (e.g., once every hour) at a pre-determined frequency interval (e.g., every 100–200 kHz) and measure the radio signal strength indicator (RSSI) to obtain a list of all FM and AM stations within the relevant metropolitan area or MSA. In such an embodiment, a service provider would be able to accommodate a vehicle having on-board unit 108 and traveling between two or more metropolitan areas or MSAs where services of a VRLS system 100 are offered.

The memory within microprocessor 730 also stores all the logged, untransmitted information (e.g., time, tuned station, GPS coordinates and any other monitored parameters) collected SDU 210 and needed for the statistical reporting purposes of VRLS system 100 as described herein.

In general operation, signals from the speaker output are detected and sent through a band pass filter (BPF) 722 which cuts off low and high frequency components (e.g., components greater than 10 kHz and lower than 1 kHz), including DC fluctuations caused by frequency hopping transitions, and then directs the signal to both a null detector 724 and a code correlator 726. First, DSP processor 728 looks for an audio mute from null detector 724—implemented with a comparator in one embodiment, which typically corresponds to the changing of the station on the radio 204. Once it has been determined that the tuned station on radio 204 has been changed, DSP processor 728 injects a coded signal into the radio 204 via the directional coupler 702 and then makes a decision about code concurrence of the received signal at the code correlator 726. In the case of positive code concurrence, DSP processor 728 successfully stops the automatic detection process as explained in more detail below with reference to FIG. 8.

V. Automatic Selected Radio Station Detection Method

Figure 8:
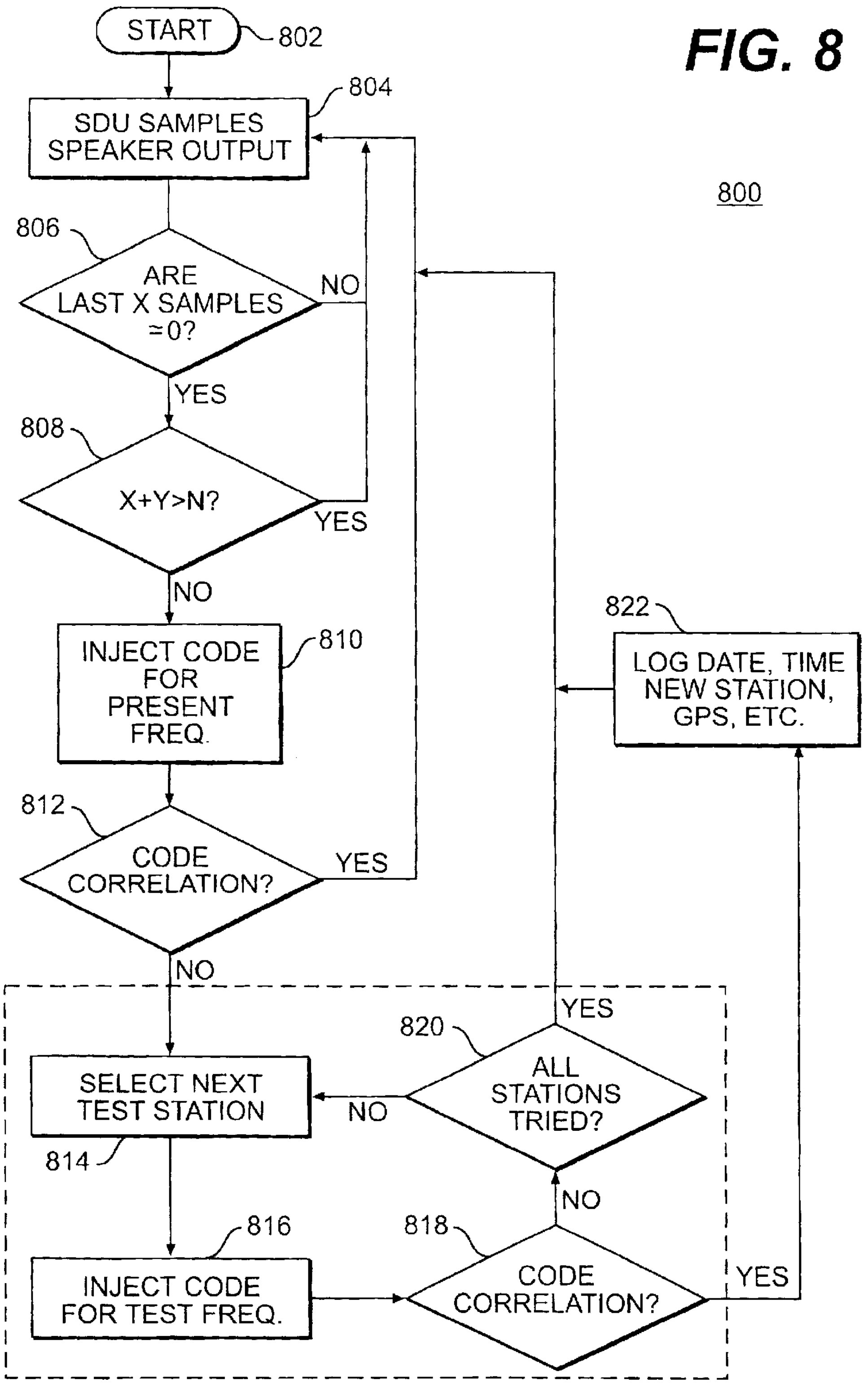
FIG. 8 is a flowchart illustrating the automatic radio station detection process according to an embodiment of the present invention.

Referring to FIG. 8, a flowchart illustrating an automatic radio station detection process 800, utilizing SDU 210 of diagram 700 according to an embodiment of the present invention, is shown. Process 800 begins at step 802 with control passing immediately to step 804.

In step 804, a main loop is entered in which SDU 210 begins the automatic radio detection process as part of the larger, comprehensive VRLS system 100. In step 804, SDU 210 samples the output of radio 204 going to speaker 206 once every pre-determined time interval. In an embodiment of the present invention, such pre-determined time interval is one millisecond (i.e., one sample every 1 millisecond).

In step 806, SDU 210 determines if the last x samples detected from the output of radio 204 are "zero" values (i.e., whether the audio voltage measurements taken by null detector 724 are so low that they approach zero). If not, this indicates that the vehicle's radio is continuously listening to a particular station and no status change has occurred. Thus, process 800 returns to the start of the main loop (i.e., step 804). If so, this indicates that there has been a pause (i.e., silence) in output directed to speaker 206. Process 800 then proceeds to step 808.

In step 808, it is determined if an additional y samples detected from the output of radio 204 are zero values. That is, SDU 210 determines whether the additional pause of output from radio 204 (x+y) is greater than a pre-determined threshold (N). If so, this indicates that radio 204 was most likely turned off and process 800 returns to the start of the main loop (i.e., step 804). If not, this indicates that the vehicle's occupants most likely changed the radio station and process 800 proceeds to step 810.

As shown in FIG. 7, steps 804-808 are accomplished by microprocessor 730 receiving signals from the output of radio 204 going to speaker 206. The signals pass through the BPF 722 and are read by the null detector 724 within microprocessor 730. As will be appreciated by one skilled in the relevant art(s) after reading the description herein, values x, y and N are pre-determined and, in one embodiment, are set to 250, 800, and 1050, respectively (assuming a 1 millisecond sampling rate in step 804). That is, values x, y and N may vary and be adjusted during installation of unit 108 according to such factors as the make (manufacturer) and model of radio 204.

Returning to process 800, in steps 810–812, SDU 210 performs a tuning pause validation routine. That is, a test signal representing the last known station which the vehicle's radio was known to be tuned to is injected into the radio 204 via the directional coupler 702. Then, code correlator 726 determines whether the signal received from the output of radio 204 going to speaker 206 matches this test signal. If so, this indicates that the original pause detected in steps 806–808 was a result of station programming error, sound silence or the like, and the vehicle's occupants have not in fact changed the tuned radio station. Thus, process 800 returns to the start of the main loop (i.e., step 804). If not, this indicates that the original pause detected in steps 806–808 is a valid tuning pause (i.e., it was in fact a result of the vehicle's occupants actually changing the tuned radio station causing the consecutive x "zero" values). (Steps 810 and 812 are similar to, and explained in more detail below with reference to steps 816 and 818, respectively.)

When step 812 determines that the vehicle's occupants have actually changed the tuned radio station, process 800 enters a detection sub-loop (i.e., steps 814–820) which identifies the new tuned station.

In step 814, the next station to be tested is selected. That is, one of the previously-identified stations stored in the memory of microprocessor 730 is selected to determine if it is the new radio station that the vehicle's occupants have tuned to. In an embodiment, the previously identified stations stored in the memory of microprocessor 730 are selected in order of frequency (e.g., lowest-to-highest or highest-to-lowest). Further, in an embodiment, if the previously tuned radio station was an FM station, step 814 selects the from all of the previously identified FM stations stored in the memory of microprocessor 730 before selecting any previously identified and stored AM stations. Conversely, if the previously tuned radio station was an AM station, step 814 selects from all of the previously identified AM stations stored in the memory of microprocessor 730 before selecting any previously identified and stored FM stations.

In step 816, a modulation frequency signal with a predetermined test (binary) code is injected into the carrier frequency signal corresponding to the station selected in step 814. This resulting test signal is then sent by modulator 720 to radio 204 through directional coupler 702. In the FM case, step 816 is accomplished by code logic in DSP processor 728 directing frequency code modulator 714 and FM synthesizer 712 to tune to the frequency of the test station selected in step 814. In the AM case, step 816 is accomplished by code logic in DSP processor 728 directing amplitude code modulator 710 and AM synthesizer 708 to tune to frequency of the test station selected in step 814. Then, in either the FM or AM cases, DSP processor 728 selects the position of switch 718 (AM or FM depending in the test radio station selection made in step 814), and closes switch 716 to allow the injection of the test signal into radio 204.

In step 818, an analysis of the radio's response to the test signal is performed. The signal received from the output of radio 204 to speaker 206 passes through BPF 722 and is read by the code correlator 722 within microprocessor 730. If DSP processor 728 determines there is not positive code concurrence (i.e., the selected test station is not the new station the vehicle's occupants have tuned to), then process 800 proceeds to step 820.

In step 820, it is determined whether all the previously identified stations stored in the memory of microprocessor 730 have already been tested. If not, process 800 returns to step 814 (i.e., the start of the detection sub-loop) and the next previously identified station stored in the memory of microprocessor 730 is chosen. If so, this indicates that all the known stations previously identified and stored in the memory of microprocessor 730 have been tested and the currently tuned station has not been identified. In an embodiment, this event may simply be logged by SDU 210 for eventual reporting to base station 110, or the list of stations may be tried again before logging the event for reporting. In an alternate embodiment, this may indicate that radio 204 is in CD or Tape mode. Process 800 then returns to the start of the main loop (i.e., step 804). As will be appreciated by one skilled in the relevant art(s) after reading the description herein, if radio 204 is in the CD or Tape mode, process 800 (i.e., null detector 724 performing steps 804–810) would detect a pause during every track change thereby monitoring for a change back to the AM/FM mode.

Returning to step 818, if DSP processor 728 determines there is positive code concurrence (i.e., the selected test station is actually the new station the vehicle's occupants have tuned to), then process 800 proceeds to step 822. In an embodiment, positive code concurrence occurs when the signal received by microprocessor 730 (phase-independently) matches, within a pre-determined threshold to account for noise, the test signal injected into radio 204 by modulator 720 (in step 816). More specifically, code concurrence occurs when the coded modulation frequency signal of the test signal is recoverable—within the threshold—from the signal received from the speaker output of radio 204. In an embodiment, such threshold would equal a value of at least 90%.

In step 822, the identity of the new tuned radio station, the time, GPS coordinates, and any other logged, untransmitted information needed for the statistical reporting purposes of VRLS system 100 as described herein, are recorded and stored in the memory of microprocessor 730. Then, as indicated by step 822, process 800 returns to the start of the main loop (i.e., step 804).

In an embodiment of the present invention, GPS receiver 212 located in vehicle-mounted field unit 108 would receive utilize an internal clock to receive coordinate data from GPS constellation system 112 once every pre-determined time period (e.g., once every 5 minutes). In one embodiment, however, GPS receiver 212 resets its internal clock to receive coordinate data from system 112 every time step 822 is performed.

Having explained process 800, steps 816 and 818 (and consequently steps 810 and 812, respectively) are now explained in more detail.

In step 816, DSP processor 728 first closes switch 716. Next, DSP processor 728 moves switch 718 to either the FM or AM positions according to the station selected in step 814 from the list of previously identified stations stored in the memory of microprocessor 730. Taking the example of where the 95.5 FM station is selected in step 814, DSP processor 728 would set and lock the PLL of FM synthesizer 712 to the frequency of 95.5 MHz, and this generates the "carrier frequency" signal. Then, DSP processor 728 would send a pre-selected, (binary) code signal having a particular frequency to the code modulator 714. This is the "modulation frequency" signal. The code modulator 714 then injects the coded modulation frequency signal into the carrier frequency signal and sends the resulting test signal to radio 204 via directional coupler 702.

In step 818, the signal received from the speaker output of radio 204 is received through BPF 722. After filtering the signal for noise, the signal is forwarded to code correlator 726. Code correlator 726 then determines if the received signal contains the same, within a certain (e.g., ≧90%) threshold to account for noise, coded modulation frequency signal injected into the carrier frequency signal. If not, this indicates that radio 204 is not tuned to the carrier frequency (i.e., 95.5 FM) of the station under test. If so, this indicates that radio 204 is in fact tuned to the carrier frequency (i.e., 95.5 FM) under test and thus, the coded modulation frequency signal passed through radio 204 and is recoverable by correlator 726.

As will be appreciated by one skilled in the relevant art(s) after reading the description herein, the process explained above is similar for an AM station being tested with switch 718 in the AM position and AM synthesizer 708 and AM code modulator 710 performing the respective functions described above.

As will also be appreciated by one skilled in the relevant art(s) after reading the description herein, step 818 in an embodiment would make use of a variable gain amplifier within SDU 210 in order to perform analog gain control to account for volume differentials within radio 204.

In an embodiment of the present invention, the modulation frequency is chosen to be as high as possible so that the vehicle's occupants cannot hear it (i.e., a frequency inaudible to humans) and that process 800 takes the shortest amount of time to perform. In one embodiment, for example, the modulation frequency is chosen to be 8 kHz when switch 718 is in the FM position and 2 kHz when switch 718 is in the AM position. Further, in an embodiment, when the PLL of FM synthesizer 712 is set to the carrier frequency being tested, the AM synthesizer 708 is set to a carrier frequency that allows it to not interfere in the injection and detection process of steps 816–818, and vice-versa.

VI. Example Implementations

Figure 6:
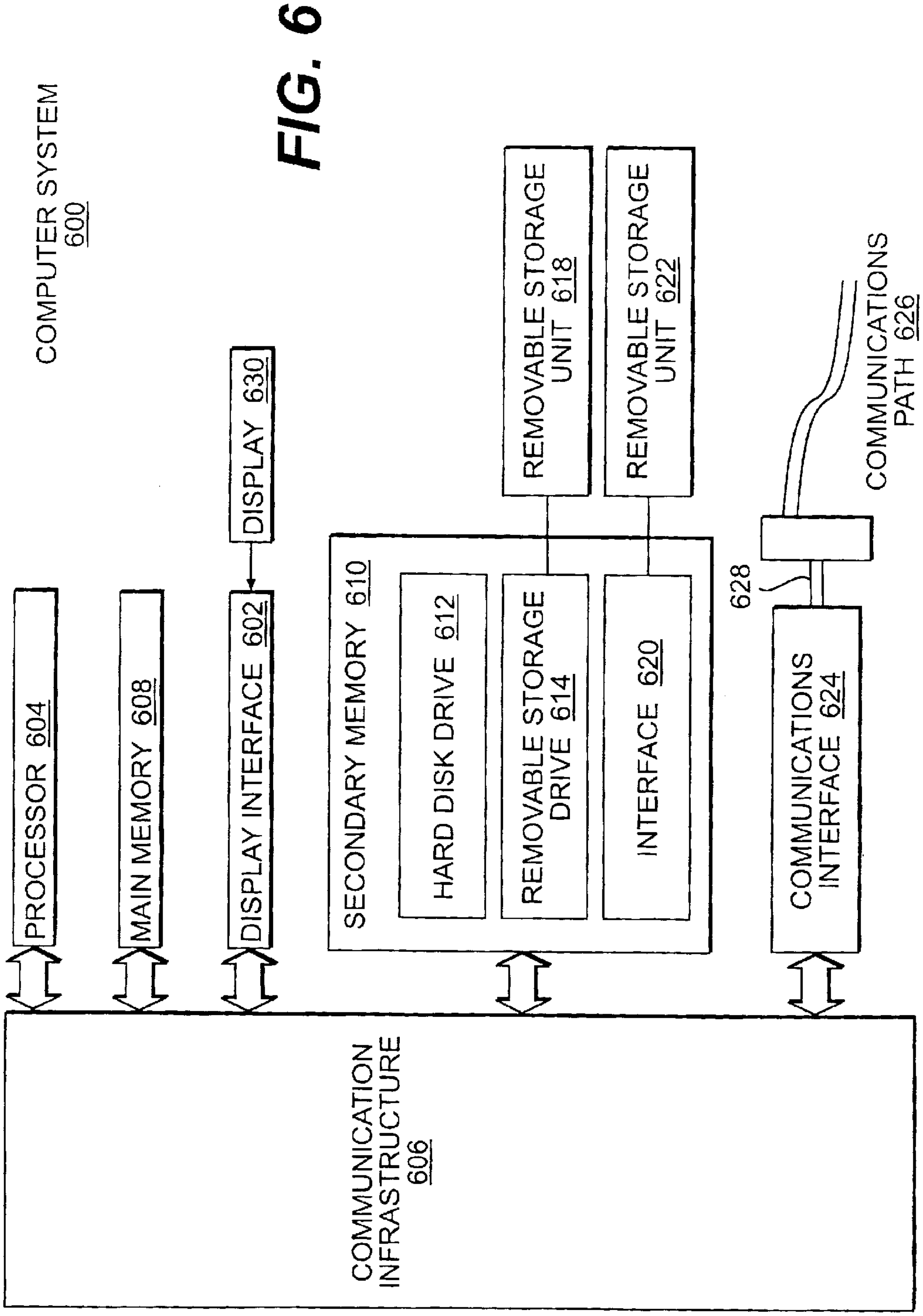
FIG. 6 is a block diagram of an exemplary computer system useful for implementing the present invention.

The present invention (i.e., VRLS system 100, vehicle-mounted field unit 108, server 106, apparatus 700, process 800, and/or any part(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 600 is shown in FIG. 6. The computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 600 can include a display interface 605 that forwards graphics, text, and other data from the communication infrastructure 602 (or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600. The invention is directed to such computer program products.

Computer programs (also called computer control logic) are stored in main memory 608 and/or secondary memory 610. Computer programs may also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. For example, the station detection apparatus (i.e., SDU 210) and method (i.e., process 800) described herein may be used for radios other than those located within vehicles. In fact, after reading this description herein, it will become apparent to a person skilled in the relevant art(s) how to implement the apparatus and method of the present invention for detecting the tuned station of any device having a tuner and a speaker (e.g., television, etc.). Thus, the present invention should not be limited by any of the above-described exemplary embodiments, but should be defined only in accordance with the following claims and their equivalents.

What is claimed is:

1. A system for allowing a user to obtain comprehensive vehicle radio listener statistics within a specific market, comprising:

a plurality of vehicles, wherein a vehicle-mounted field unit is coupled to the radio of each of said plurality of vehicles;

means, within each of said plurality of vehicle-mounted field units, for receiving global positioning system data indicative of position and time information of each of said plurality of vehicles;

a base station server capable of receiving radio parameter information and said position and time information from each of said plurality of vehicle-mounted field units located in each of said plurality of vehicles, and producing statistics based on said received radio parameter information and said received position and time information;

a communications means for facilitating two-way communications between said base station server, and said plurality of vehicle-mounted field units; and a graphical user interface (GUI), provided by said base station server, in order to deliver reports to the user containing said statistics based on said received radio parameter information and said received position and time information.

2. The system of claim 1, wherein said radio parameter information comprises at least one of the following: radio status; station preset information; and current frequency setting.

3. The system of claim 1, wherein said radio parameter information comprises a volume percentage reading.

4. The system of claim 1, wherein at least a portion of said communications means for facilitating two-way communications includes at least one of the following: satellite communications; code division multiple access (CDMA) communications; time division multiple access (TDMA) communications; and Bluetooth® wireless communications.

5. The system of claim 1, wherein at least a portion of said communications means for facilitating two-way communications includes at least one of the following: pager communications, satellite communications; cellular telephone communications; and wireless broadband communications.

6. The system of claim 1, wherein said GUI is provided by said base station server to the user over at least a portion of the global Internet.

7. A method for allowing a user to obtain comprehensive vehicle radio listener statistics within a specific market, comprising the steps of:

receiving, via a two-way communications network, time and global positioning system coordinate data from a vehicle-mounted field unit coupled to the radio of a vehicle;

receiving, via said two-way communications network, radio parameter information from said vehicle-mounted field unit located in said vehicle;

producing statistics based on said received radio parameter information and said received time and global positioning system coordinate data; and delivering, via a graphical user interface (GUI), a report to the user containing said statistics based on said received radio parameter information and said received time and global positioning system coordinate data.

8. The method of claim 7, further comprising the step of: sending an acknowledgment to said vehicle-mounted field unit located in said vehicle via said two-way communications network.

9. The method of claim 7, wherein said radio parameter information includes at least one of the following: radio status; station preset information; and current frequency setting.

10. The method of claim 7, wherein said radio parameter information includes a volume percentage reading and global positioning system coordinates.

11. The method of claim 7, wherein at least a portion of said two-way communications network includes at least one of the following: satellite communications; code division multiple access (CDMA) communications; time division multiple access (TDMA) communications; and Bluetooth® wireless communications.

12. The method of claim 7, wherein at least a portion of said two-way communications network includes at least one of the following: pager communications, satellite communications; cellular telephone communications; and wireless broadband communications.

13. The method of claim 7, wherein said GUI is provided to the user over at least a portion of the global Internet.

14. The method of claim 7, wherein said receiving radio parameter information from said vehicle-mounted field unit step is performed periodically on a pre-determined time interval.

15. A computer program product comprising a computer usable medium having control logic stored therein for causing a computer to allow a user to obtain comprehensive vehicle radio listener statistics within a specific market, said control logic comprising:

first computer readable program code means for causing the computer to receive, via a two-way communications network, time and global positioning system coordinate data from a vehicle-mounted field unit attached to the radio of a vehicle;

second computer readable program code means for causing the computer to receive, via said two-way communications network, radio parameter information from said vehicle-mounted field unit located in said vehicle;

third computer readable program code means for causing the computer to produce statistics based on said received radio parameter information and said received time and global positioning system coordinate data; and fourth computer readable program code means for causing the computer to deliver, via a graphical user interface (GUI), a report to the user containing said statistics based on said received radio parameter information and said received time and global positioning system coordinate data.

16. The computer program product of claim 15, wherein said radio parameter information includes at least one of the following: radio status; station preset information; and current frequency setting.

17. The computer program product of claim 15, wherein said radio parameter information includes a volume percentage reading.

18. The computer program product of claim 15, wherein at least a portion of said two-way communications network includes at least one of the following: satellite communications; code division multiple access (CDMA) communications; time division multiple access (TDMA) communications; and wireless communications.

19. The computer program product of claim 15, wherein said GUI is provided to the user over at least a portion of the global Internet.

20. The computer program product of claim 15, further comprising: fifth computer readable program code means for causing the computer to send an acknowledgment to said vehicle-mounted field unit located in said vehicle via said two-way communications network.

* * * * *